United States Patent [19]

Kelly et al.

[11] 4,369,940
[45] Jan. 25, 1983

[54] AIRBREATHING PROPULSION SYSTEM FOR SUPERSONIC VEHICLES

[75] Inventors: Patrick J. Kelly, St. Charles; Gerald T. Arcangeli, St. Louis County, both of Mo.

[73] Assignee: McDonnell Douglas Corporation, St. Louis, Mo.

[21] Appl. No.: 104,289

[22] Filed: Dec. 17, 1979

[51] Int. Cl.³ ............................................. F42B 15/02
[52] U.S. Cl. ................................. 244/3.21; 60/204;
60/270 R; 244/3.1; 244/53 A
[58] Field of Search ................... 244/3.1, 3.21, 53 R,
244/53 A, 73 R, 74; 60/204, 270 R, 270 S

[56] References Cited

U.S. PATENT DOCUMENTS

| | | | |
|---|---|---|---|
| 2,925,711 | 2/1960 | Townsend | 244/74 |
| 2,970,431 | 2/1961 | Harshman | |
| 2,995,892 | 8/1961 | Kosson et al. | |
| 3,011,307 | 12/1961 | Edelfelt | |
| 3,027,118 | 3/1962 | Willox | |
| 3,067,578 | 12/1962 | Goodall et al. | |
| 3,086,357 | 4/1963 | Rubin et al. | 137/15.2 |
| 3,208,383 | 9/1965 | Larson | 60/270 X |
| 3,403,873 | 10/1968 | Bell et al. | 244/3.21 |
| 3,514,957 | 6/1970 | Evans | 137/15.2 |
| 3,524,458 | 8/1970 | Goldsmith | |
| 4,028,886 | 6/1977 | Hackett | |
| 4,291,533 | 9/1981 | Dugger et al. | 137/15.2 |

Primary Examiner—Harold J. Tudor
Attorney, Agent, or Firm—Gravely, Lieder & Woodruff

[57] ABSTRACT

A propulsion system for airbreathing vehicles having a ducted inlet for a supersonic powerplant and incorporating means in the vehicle for momentarily changing the normal flight attitude of the vehicle for obtaining high inlet pressure recovery for the propulsion powerplant and thereafter returning the vehicle to a normal flight attitude.

8 Claims, 10 Drawing Figures

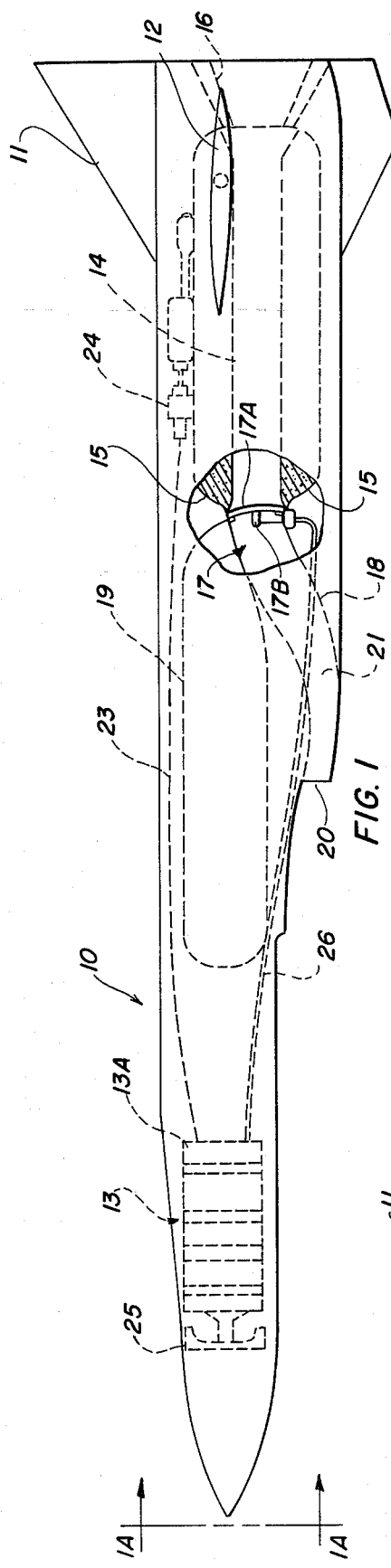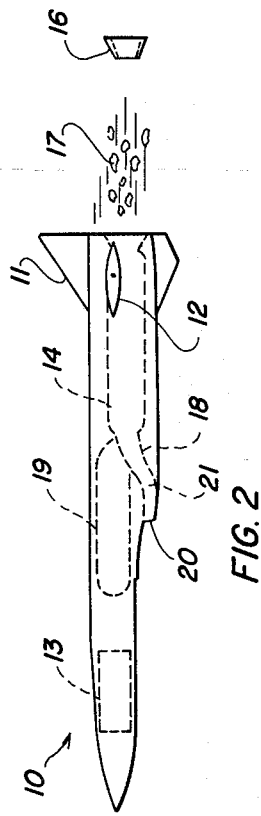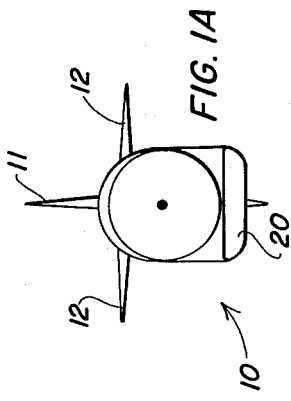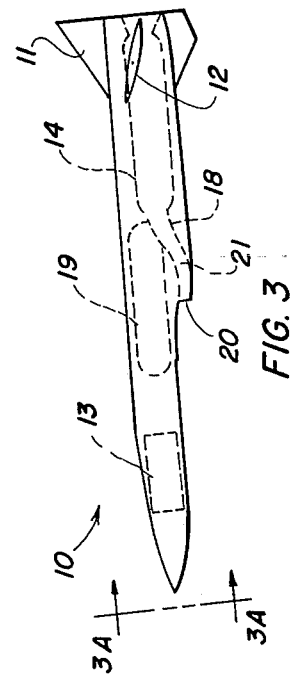

AIRBREATHING PROPULSION SYSTEM FOR SUPERSONIC VEHICLES

BACKGROUND OF THE INVENTION

At supersonic flight speed for airbreathing propulsion engines it is desirable for the engine to operate with its air inlet in a started condition in order to reduce the drag and to obtain maximum air flow into the engine. An air inlet to which air approaches at supersonic velocity is said to have "started" when the shock region between the transition from supersonic flow to subsonic flow of entering air is at or downstream of the inlet throat region. Starting of such an inlet is facilitated if the inlet area contraction from the inlet entrance to the inlet throat is small. With a given contraction from a particular inlet opening the inlet will start easier at higher supersonic speeds. Also the inlet pressure recovery increases with increase in the contraction, that is with decrease in the area of the inlet throat for a particular inlet entrance opening. Hence, at low supersonic speeds the inlet throat, for a particular inlet entrance opening, should provide a relatively small contraction in the inlet throat area from the entrance opening, whereas at higher supersonic speeds the inlet will start with a greater contraction, such as a smaller throat area. The prior art recognizes that it is desirable, with an inlet of a particular inlet entrance opening, to reduce the throat area of the inlet at higher supersonic speeds in order to increase the inlet pressure recovery.

When a vehicle travels at some given velocity, the air has a total pressure energy relative to the powerplant of the vehicle by virtue of the velocity of the powerplant relative to the air. The efficiency of the powerplant is dependent to a large extent upon the amount of total pressure energy which is retained by the air which is being ducted into the powerplant. Therefore, it has been a problem to funnel the air into a powerplant with a minimum loss in the total pressure energy. Since disturbances in air are transmitted at the speed of sound, a vehicle traveling at a supersonic velocity is unable to communicate its presence in the air ahead of it. The result is that a shock wave or series of shock waves are formed, and such shock waves result in a loss in total pressure energy. The magnitude of the loss of pressure energy depends on the type of shock wave, the Mach number ahead of the shock wave, and the angle through which the flow is deflected by the shock wave. There are the normal shock and the oblique shock. A characteristic of the normal shock is that the flow behind it is always subsonic, and the loss in total pressure energy is a function of the upstream Mach number with very large losses occurring at relatively low supersonic upstream velocities. It is recognized that the inlet for a powerplant traveling at supersonic speed should be designed so that the occurrence of a normal shock could be eliminated. However, since the air must be brought to a subsonic velocity in order to be used efficiently, it is not feasible to eliminate the normal shock completely.

Considering a duct having an arbitrary cross section in whch air is flowing, if the cross sectional area is at all points equal, the velocity, and therefore the Mach number for the ideal case, will remain constant, but if the cross sectional area varies the Mach number will also vary. It is also known that for the case of subsonic flow in a duct a converging passage will accelerate the flow and a diverging passage will decelerate the flow. For supersonic flow in a duct the effect of changes in area is just opposite. That is, a diverging passage will accelerate the flow while a converging passage will decelerate it, and in no case is it possible to reduce the area below that required for sonic velocity without a corresponding decrease in the weight flow. When a duct having a supersonic flow approaching it is considered, and if the duct forms the inlet to a supersonic powerplant, it would be desirable to decelerate the flow from the original supersonic Mach number to a Mach number nearer and slightly above 1 by means of a converging inlet. The ratio of inlet area to minimum area which would be required to decelerate a given flow to a Mach number equal to or near 1 is a function only of the original or approach Mach number with the required area ratio increasing with increasing approach Mach number. This ratio is called the "theoretical area ratio".

If it is assumed that the air duct is formed with a converging inlet such that the area ratio is equal to the theoretical area ratio for a particular approach Mach number, the so called starting shock must be swallowed before supersonic flow can be established in the inlet. In the case of a supersonic powerplant, when the powerplant is traveling at below designed speed, a normal shock will be located ahead of the inlet. This shock is formed because the minimum area will not permit the entire flow to pass, and the result is that some of the air approaching the inlet will be spilled around the outside, and a shock results because of the abrupt change in direction. When such a powerplant gains the desired speed the normal shock passes through the inlet and establishes supersonic flow and no flow spilled around the outside. From the foregoing theory it is known that the Mach number after the normal shock is subsonic with the value thereof being determined only by the approach Mach number, and since the flow is subsonic in the inlet behind the normal shock, the converging inlet will accelerate the flow. The amount of convergence, or the area ratio, is limited to the value which results in Mach 1 at the minimum throat area. This ratio of inlet area to throat area will be called the "critical area ratio" and for all supersonic approach Mach numbers this critical area ratio is less than the theoretical area ratio. As a consequence, a converging inlet of fixed geometry can have an area ratio no greater than the critical area ratio. Such an inlet would start, that is, swallow the starting shock, but after supersonic flow has been established in the inlet the amount of deceleration would be small. The normal shock inside the duct is required since the air flow must be made subsonic if it is to be used efficiently by the powerplant.

In accordance with the foregoing discussion of theory, the prior art has moved to operate powerplants efficiently by varying the area ratio. So that when starting, the area ratio is less than the critical and when in normal operation the area ratio is near the theoretical value such that the flow decelerates to near sonic at the throat. Means for varying the area ratio in supersonic powerplants has been disclosed by Kosson et al U.S. Pat. No. 2,995,892 of Aug. 15, 1961; Harshman U.S. Pat. No. 2,970,431 of Feb. 7, 1961; Willox U.S. Pat. No. 3,027,118 of Mar. 27, 1962; Edelfelt U.S. Pat. No. 3,011,307 of Dec. 5, 1961; Goodall et al U.S. Pat. No. 3,067,578 of Dec. 11, 1962 and Goldsmith U.S. Pat. No. 3,542,458 of Aug. 18, 1970.

As shown in the prior art, an airborne body may have a dual propulsion powerplant in which the propulsion for launching may not require airbreathing, but when shifting to sustaining propulsion airbreathing is provided. Such a system is shown in Hackett U.S. Pat. No. 4,028,886 of June 14, 1977.

BRIEF DESCRIPTION OF THE INVENTION

The present invention is directed to improvements in airbreathing propulsion systems for supersonic vehicles.

A principal object of the present invention is to provide improved performance in airbreathing propulsion powerplants for supersonic vehicles by forming the air inlet with a constant geometric configuration and maneuvering the vehicle into a position where starting the inlet can be accomplished quickly through momentary positioning of the vehicle body to reduce the inlet capture and to produce the starting desired.

It is a further object of the present invention to provide a supersonic vehicle with an airbreathing powerplant and means for maneuvering the vehicle into a position where reduction in the inlet capture area can be achieved without varying the geometric configuration of the inlet.

Another object of the present invention is to provide a supersonic vehicle having an airbreathing powerplant to maneuver the vehicle such that the inlet capture characteristic can be relied upon to start an otherwise overly contracted air inlet duct.

Other objects of the present invention are directed to providing means for starting a contracted inlet for an air breathing powerplant without incorporating variable geometric configurations, whereby supersonic vehicles may be produced in large quantities at a substantial cost reduction and without detriment to the efficient operation of the powerplant; such objects permitting the adoption of a fixed contracted inlet to be used in combination with means for maneuvering the vehicle body into a momentary position to obtain the necessary starting by reducing the inlet capture area within starting limits and to return the vehicle to its normally intended flight attitude.

BRIEF DESCRIPTION OF THE DRAWINGS

The present invention is disclosed in one embodiment in the accompanying views of the drawings, wherein:

FIG. 1 is a schematic longitudinal view of an airborne rocket-to-ramjet vehicle having powerplants arranged for launching and sustained flight, and having an air inlet passage for the airbreathing powerplant;

FIG. 1A is a view of the vehicle seen in FIG. 1 taken from the nose thereof;

FIG. 2 is a view similar to FIG. 1, but schematically showing the staging of the flight when converting from rocket to ramjet propulsion;

FIG. 3 is a schematic view of the control means for guiding the vehicle in its longitudinal attitude;

FIG. 3A is a view of the vehicle seen in FIG. 3 with control surfaces in moved positions;

DETAILED DESCRIPTION OF THE EMBODIMENT

Figure 4:
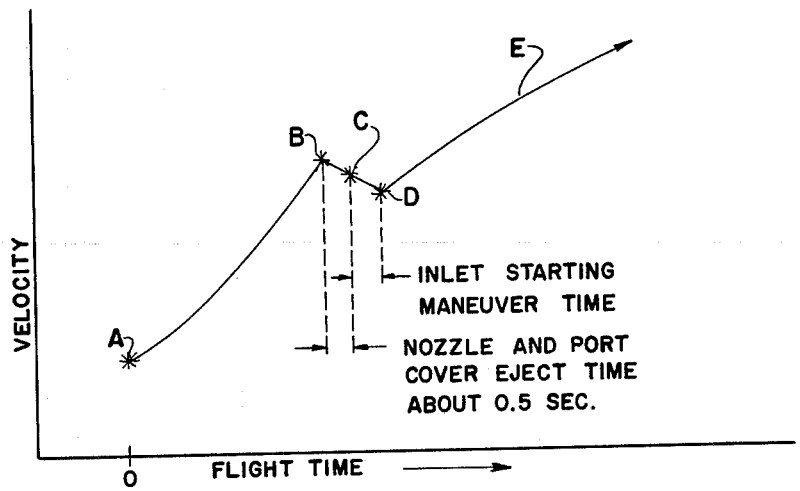
FIG. 4 is a graphic illustration of the propulsion regime for the vehicle of FIG. 1.

A preferred embodiment of the present invention will be described in connection with an airbreathing body or missile. In such an airbreathing body it is preferred to provide a powerplant which is a combination in which rocket propulsion is utilized to obtain launching of the body, while ramjet propulsion is utilized for sustained flight. In such an airbreathing body or missile, high inlet pressure recovery is required to realize the full performance potential of the propulsion system. Inlet pressure recovery performance may be improved by providing internal contraction within the inlet, in the manner suggested in the prior art identified above. However, an internally contracted inlet cannot be started except with the provision of variable geometry incorporated therein to effect initially reduced air flow until supersonic flow is established in the inlet. As pointed out above an air inlet to which air approaches at supersonic velocity is started when the shock region between the transition from supersonic flow to subsonic flow of entering air is at or downstream of the inlet throat area. What happens is that the shock is swallowed in the inlet so that the inlet pressure recovery increases if the throat area contraction is increased relative to the inlet entrance opening. It is recognized that the production of large numbers of airbreathing bodies, such as missiles, involves a considerable cost and, in general, the performance gains due to internal contraction are difficult to justify when the cost and complexity of a variable geometry inlet is taken into consideration.

The present invention is directed to an improvement to obtain starting of an internally contracted inlet by avoiding the need for mechanism for varying the geometry of the inlet. The improvement is obtained by maneuvering the missile body into a position such that the inlet is positioned to reduce the capture area such that the total contraction is within inlet starting limits. As soon as supersonic flow is established the missile body is returned to its normal flight path. There is great advantage in utilizing the improved inlet starting maneuver as missile performance can be improved while maintaining cost reduction by elimination of variable geometry mechanism.

Turning now to the drawings there is seen in FIG. 1 a missile body combining rocket as well as ramjet propulsion. The body 10 is provided with flight control surfaces 11 and 12, which surfaces are under the control of a preprogrammed guidance assembly 13 mounted within the body 10 in a suitable forward location. The aft end of the body is provided with a combustion chamber 14 containing a body of rocket propellant fuel 15. The combustion chamber 14 is provided with a nozzle assembly 16, and at its leading end there is a frangible cover assembly 17. This assembly, consists of a frangible glass dome 17A and a wall fragmenter 17B such as that described in Hackett U.S. Pat. No. 4,028,886. This assembly 17 blocks the flow of ambient air into the combustion chamber from the conduit 18. During launch by means of the rocket propellant, no air is required. However, for ramjet propulsion the body 10 is provided with a container 19 for a suitable fuel to be utilized when the rocket propellant 15 is used up and the propulsion system converted to ramjet propulsion for sustained flight.

At the conclusion of the burn out of the rocket propellant the preprogrammed guidance assembly 13 functions to jettison (as shown in FIG. 2) the nozzle assembly 16 and to cause the frangible cover assembly 17 to disintegrate. This operation is immediately followed by the supply of the ramjet fuel into the combustion chamber 14 for sustaining the flight of the body 10. In order to obtain desired starting of the ramjet propulsion system the guidance control assembly maneuvers the horizontal control surface 12 into a position where the body 10 is pitched into a negative angle of attack relative to the longitudinal angle of its axis. When the starting of the inlet is accomplished the guidance system returns the missile body 10 to the flight position shown in FIG. 2. The maneuver of the body 10 between the position in FIG. 2 and the position in FIG. 3 takes place in approximately 0.25 sec., and the guidance system is provided with the necessary preprogrammed commands to assure obtaining inlet starting.

FIG. 4 is a graph illustrating a typical relationship between missile velocity and flight time. In this graph the line between points A and B depicts the rocket launch of the missile 10 and its increase in velocity with time. At the rocket fuel burn out, which occurs at approximately point B, the missile 10 enters into a short coast phase prior to the propulsion system taking over in ramjet operation. The coast phase is illustrated by the line extending from point B toward point D, and during this coasting or deceleration the nozzle assembly 16 and the frangible cover assembly 17 are jettisoned as illustrated in FIG. 2. This event is immediately followed by the guidance assembly maneuvering the missile body 10 into its negative angle of attack to obtain the inlet starting which is shown to be performed in a very short time period. Sustained flight of the missile 10 by means of ramjet propulsion is illustrated by the graph line E.

It is seen in FIG. 1 that the air inlet conduit 18 is formed with a fixed area inlet 20 and a fixed throat area 21. By means of the preprogrammed guidance assembly 13 the missile body 10 may be maneuvered into the position shown in FIG. 3 so as to obtain a low ratio of the inlet area 20 presented to the approaching airstream relative to the throat area 21. After the inlet has started the missile body is returned to its normal flight attitude so that the ratio of the inlet area 20 to the throat area 21 is a high ratio. It is desirable to have the ratio of the capture area of the inlet 20 to the throat area 21 high in order to obtain this performance as has been pointed out above.

As seen in FIG. 1 the control system for maneuvering and directing the vehicle 10 includes the guidance assembly 13 which includes a preprogrammed control package 13A connected by suitable leads in a bundle 23 to an hydraulic assembly 24. The assembly 24 is provided to alter the position of the vertical surface 11 as well as the horizontal surfaces 12 for accomplishing both the control over the flight path for the vehicle in response to signals developed by the seeker device 25 and the momentary maneuver, as seen in FIG. 3, for starting the inlet 20 upon the conclusion of the launch phase. The control signals received by the assembly 24 are translated by suitable means (not believed necessary to show) to the vertical and horizontal surfaces.

Figure 5B:
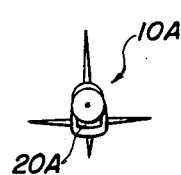
FIGS. 5A and 5B are respectively a longitudinal and an end elevation of a modified vehicle having a chin air inlet.
Figure 5A:
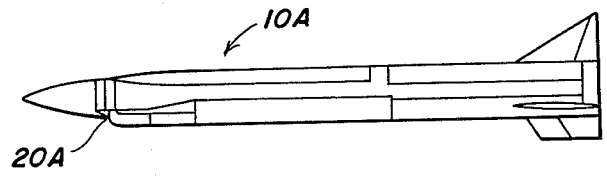
Figure 6B:
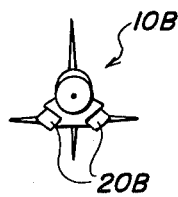
FIGS. 6A and 6B are views similar to FIGS. 5A and 5B showing a further modification for the vehicle of this invention.
Figure 6A:
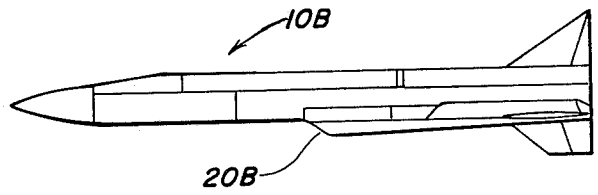

The modification seen in FIGS. 5A and 5B illustrates the arrangement of the inlet 20A for the vehicle 10A close to the forward end in what may be referred to as a chin inlet. A further modification is shown in FIGS. 6A and 6B where dual inlets 20B are arranged in positions off axis to form cheek inlets 20B for the vehicle 10B. Each vehicle 10A and 10B is provided with the various components described for the vehicle of FIG. 1.

The foregoing disclosure has been directed to a missile-type vehicle for purposes of illustrating the invention wherein a launch medium is employed to accelerate the vehicle to a velocity where ramjet propulsion becomes self-supporting. However, the invention may be employed in connection with providing the propulsion for aircrafts generally.

What is claimed is:

1. In an airbreathing propulsion system for a supersonic vehicle, the improvement which comprises: a body having an air receiving duct formed with a fixed cross-sectional area inlet opening from a side of said body and said duct having a converging throat spaced from said inlet opening and having a lesser cross-sectional area than said inlet opening; a propulsion powerplant communicating with said duct downstream from said converging throat to utilize the air flowing therethrough; and means carried by said body for maneuvering the body into a position for starting said duct, said maneuvering means including a vehicle body guidance means and body flight attitude control means, said guidance means being operative on said control means for positioning said fixed cross-sectional area inlet relative to the airstream flow over said body such that its area presented to the airstream flow is reduced for starting said inlet to supply air for the airbreathing propulsion system.

2. The improvement set forth in claim 1, wherein said powerplant includes rocket propulsion means for propelling said body up toward supersonic speed, and ramjet propulsion means utilizing the air flow through said duct for propelling said body in sustained flight.

3. The improvement set forth in claim 1, wherein said guidance means is operative on said control means to maneuver said body toward a negative angle of attack in its flight attitude for effecting the starting of said duct.

4. The improvement set forth in claim 1, wherein said powerplant includes a source of a solid propellant for launching said body toward supersonic velocity; means blocking air flow through said duct to said source of launching propellant; a source of fuel for sustaining supersonic flight; and means responsive to said maneuvering means maneuvering said body into a position for starting said duct for removing said blocking means thereby establishing air flow in said duct for utilizing said source of fuel for sustaining supersonic flight.

5. In an airbreathing propulsion system for an airborne body requiring air inlet starting for the airbreathing propulsion system, the improvement which comprises: a propulsion powerplant carried by the body; air flow means for the body having air intake means opening from a side and having a fixed cross-sectional capture area facing into the airstream and a duct leading into the powerplant and formed with a converging cross-sectional throat area in advance of said duct communicating with said powerplant, said air intake means cross-sectional capture area being greater than the cross-sectional area of said converging section; means on the body for controlling the positional attitude of the intake means relative to the airstream; and body guidance means operatively connected to said positional attitude controlling means for substantially momentarily changing the positional attitude of the body such that the intake means is maneuvered to a position to reduce its cross-sectional capture area presented to the airstream relative to the cross-sectional throat area whereby the normal shock in the air approaching the intake means is swallowed in the intake means for starting said intake means to supply air to the airbreathing propulsion system.

6. The improvement set forth in claim 5, wherein said powerplant comprises first means for effecting the launching of the body up to supersonic velocity, and second means requiring air for effecting substantially sustained supersonic velocity; and said substantially momentary change in the positional attitude of the body occurs between the launching of the body up to supersonic velocity and the effecting of sustained supersonic velocity.

7. The improvement set forth in claim 5, wherein said body is formed with an elongated axis in the direction of its path of movement, and said intake means for said air flow means is disposed adjacent the forward portion of said body.

8. The improvement set forth in claim 5, wherein said powerplant includes propulsion means operative in a phase for launching and accelerating said body, and airbreathing means for continuing the propulsion of said body in sustained flight; and said body positioned attitude control means responsive to said body guidance means so as to be effectively operative between said propulsion phase and said airbreathing propulsion for moving said body toward a negative angle of attack which effects said reduction in its said cross-sectional capture area presented to the airstream relative to the cross-sectional throat area.

* * * * *